United States Patent [19]

Sato

[11] 4,310,178
[45] Jan. 12, 1982

[54] THREE POINTS PASSIVE SEAT BELT ASSEMBLY

[75] Inventor: Yoshimi Sato, Yokohama, Japan

[73] Assignee: Nissan Motor Co., Ltd., Yokohama, Japan

[21] Appl. No.: 103,578

[22] Filed: Dec. 14, 1979

[30] Foreign Application Priority Data

Dec. 21, 1978 [JP] Japan .......................... 53-177211[U]

[51] Int. Cl.³ ............................................ B60R 21/10
[52] U.S. Cl. .................................... 280/802; 297/469
[58] Field of Search ............... 280/802, 801, 803, 806, 280/807, 808; 297/468, 469, 470, 474, 475, 481

[56] References Cited

U.S. PATENT DOCUMENTS

| 3,915,473 | 10/1975 | Lindblad | 280/804 |
| 4,101,170 | 7/1978 | Mori et al. | 297/475 |
| 4,165,100 | 8/1979 | Takada | 280/802 |
| 4,230,343 | 10/1980 | Takada | 280/803 |

Primary Examiner—Joseph F. Peters, Jr.
Assistant Examiner—Donn McGiehan

[57] ABSTRACT

A three points passive seat belt assembly which automatically holds or releases vehicle passenger when the door is closed or opened. Extendable pull means holds lap belt portion of the belt at a higher position when the door is opened.

3 Claims, 3 Drawing Figures

THREE POINTS PASSIVE SEAT BELT ASSEMBLY

BACKGROUND OF THE INVENTION

The present invention relates to a three points passive seat belt assembly of the type including a first belt extending from an upper rear portion of a door sash of the vehicle through a through-ring at one end of a second belt to a lower rear portion of the door, and a retractor holding the other end of the second belt at a center portion of the vehicle.

Such a three points passive seat belt assembly which automatically holds or releases vehicle passenger when the door is closed or opened is known and as shown in FIG. 1. One end of a first belt is connected with a door sash 2' and extends through a through-ring 5 to an anchor 6 which is connected with a lower rear portion of the door 2. The first belt forms a shoulder belt portion A and a lap belt portion B. A second belt C extends between the through-ring 5 and a retractor 7 at the other side of a seat 9.

When the door 2 is opened, the seat belts A, B and C release vehicle passenger as shown in FIG. 1. When the door 2 is closed, the seat belt wraps across the shoulder and waist of the vehicle passenger, and the retractor 7 retracts the second belt C to maintain the belt portions A, B and C under predetermined tension. At emergency, the belt portions are arrested by the retractor 7 to protect the passenger.

When the door 2 is opened as shown in FIG. 1, the lap belt portion B of the first belt extends at a lower position. Thus, vehicle passenger's feet are disturbed when he enters in or leaves from the vehicle.

SUMMARY OF THE INVENTION

Accordingly, an object of the present invention is to provide a three points passive seat belt assembly which does not disturb passenger's feet when the door is opened.

Another object of the present invention is to provide a simple and less expensive seat belt assembly.

The three points passive seat belt assembly of the above-mentioned type, according to the present invention, comprises pull means pulling a portion of lap belt portion of the first belt toward generally center rear portion of the door.

The pull means may be an elongate resilient member or a cord associated with a winding device.

By the provision of the simple pull means, according to the present invention, the lap belt portion of the first belt is kept at a higher position when the door is opened, so that the passenger's feet are not disturbed.

The present invention will now be explained more in detail with reference to some preferred embodiments shown in the accompanying drawings.

DETAILED DESCRIPTION OF THE PREFERRED EMBODIMENTS

Figure 2:
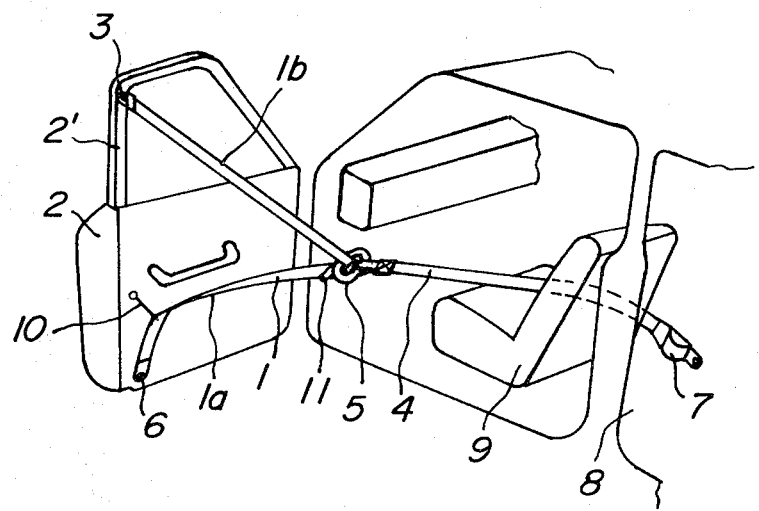
FIG. 2 is a perspective view of a portion of a vehicle showing a seat belt assembly according to one embodiment of the present invention.

Referring to FIG. 2, the three points passive seat belt assembly according to the present invention comprises a first belt 1 which is mounted at one end to an upper rear portion of a door sash 2' of a door 2 through an anchor 3, and extends through a through-ring 5 which is secured to one end of a second belt 4 to a lower rear portion of the door 2 by an anchor 6 or a retractor, not shown. The other end of the second belt 4 is mounted through a retractor 7 to a floor 8 or a seat 9 at the center portion of the vehicle. A pull member, i.e., an elongate resilient member 10, according to the present invention, pulls a portion of a lap belt portion 1a of the first belt 1 to a center rear portion of the door 2. A substantial portion of the resilient member 10 extends in the door 2. A pin 11 which acts as a restrict member is secured to the end portion of the lap belt portion 1a to restrict the through-ring 5 at a predetermined position. The restrict member may be a buckle in place of the pin 11.

Figure 1:
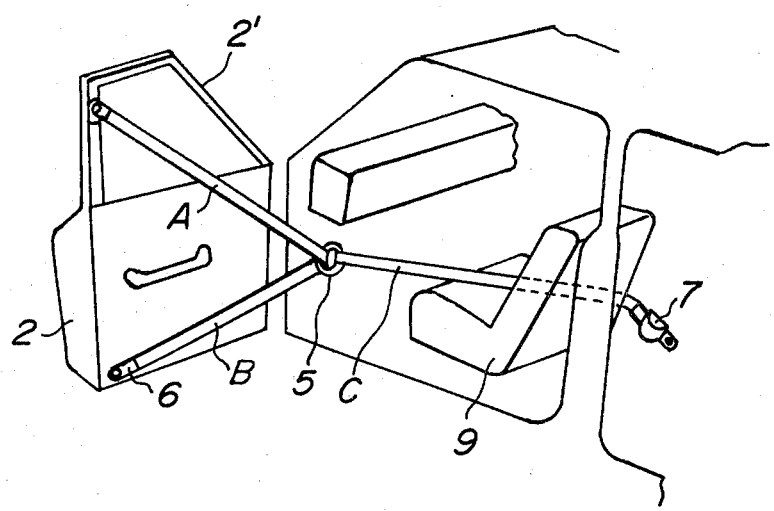
FIG. 1 is a perspective view of a portion of a vehicle showing a conventional seat belt assembly as mentioned above.

With the arrangement thus far described, when the door 2 is opened, the first belt 1 pulls the second belt 4 through the through-ring 5 from the retractor 7 against the retracting force. The first belt 1 moves through the through-ring 5 such that the length of the shoulder belt portion 1b increases and the length of the lap belt portion 1a decreases, until the pin 11 contacts with the through-ring 5 to restrict the movement of the belt 1. The lap belt portion 1a is pulled to a higher position by the elongate resilient member 10 as shown in FIG. 2. Thus, the lap belt portion 1a and the second belt 4 are dislocated forwardly from the seat 9 and are kept at a relatively higher position as compared with the belts B and C of the conventional assembly shown in FIG. 1. Consequently, the belts 1 and 4 do not disturb feet of vehicle passenger.

The elongate resilient member 10 may be a slender rubber cord which does not disturb retraction of the belt 4 when the door 2 is closed.

Figure 3:
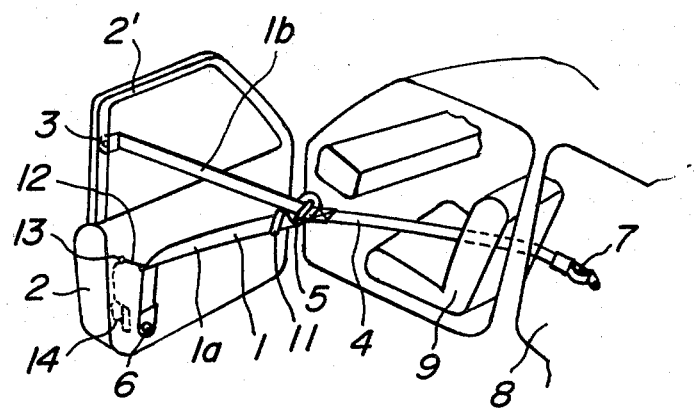
FIG. 3 shows another embodiment of the seat belt assembly according to the present invention.

As shown in FIG. 3 which shows a second embodiment of the present invention, a cord 12 is connected at one end with the lap belt portion 1a of the first belt 1. The cord 12 is passed through an opening 13 formed into the door 2 at a center rear portion thereof, and is connected at the other end with a winding device 14, such as a retractor disposed inside of the lower portion of the door 2. By the pull force of the winding device 14, the cord 12 exhibits same effect with the resilient member 10 shown in FIG. 2.

The pull force of the winding device 14 is selected to be smaller than the retracting force of the retractor 7 so that the operation of the retractor 7 is not disturbed by the winding device 14.

The cord 12 may be a narrow web. The winding device 14 may be a retractor of relatively weak pulling force or a pulley which is frictionally driven by an electric motor which is temporarily energized when the door 2 is opened.

The three points passive seat belt assembly according to the present invention is simple and less expensive when compared with other known assembly. The seat belt does not disturb feet of the vehicle passenger. As the resilient member 10 or the cord 12 extends along the lap belt portion 1a from the rear portion of the door 2, the member 10 or the cord 12 does not disturb movement of the vehicle passenger when he intends to place his arm on an arm rest of the door 2 or to operate the door handle. Thus, the interior design of the cabin is not adversely affected. Also, the pull member 10 or 12 is hidden in the door 2 when the door 2 is opened and extends between the door 2 and the seat 9 generally along the lap belt portion 1a, so that the appearance is not adversely affected.

What is claimed is:

1. A three point passive seat belt assembly for a vehicle comprising a first belt extending from an upper rear portion of a door sash of the vehicle to a lower rear portion of the door, and having a shoulder belt portion and a lap belt portion, a second belt having at its one end a through-ring through which the first belt extends, a retractor exerting a force holding the other end of the second belt at a center portion of the vehicle, and pull means which, upon application of a force smaller than the retracting force of the retractor, pulls a portion of the lap belt portion toward the center rear portion of the door.

2. A seat belt assembly as claimed in claim 1, wherein said pull means is an elongate resilient member extending between said lap belt portion of the first belt and said center rear portion of the door, a substantial portion of the resilient member being within the door.

3. A seat belt assembly as claimed in claim 1, wherein said pull means comprises a cord connected at one end with a portion of said lap belt portion of the first belt, and a winding device within the door to wind the other end of the cord.

* * * * *